April 2, 1935.  E. F. SCHNEDAREK ET AL  1,996,491
APPARATUS FOR MAKING RUBBER TUBES
Filed Feb. 2, 1931  8 Sheets-Sheet 1

INVENTORS
Emil F. Schnedarek
BY Thomas J. Smith
Evans & McCoy
ATTORNEYS

April 2, 1935. E. F. SCHNEDAREK ET AL 1,996,491
APPARATUS FOR MAKING RUBBER TUBES
Filed Feb. 2, 1931 8 Sheets-Sheet 2

INVENTORS
Emil F. Schnedarek
Thomas J. Smith
BY Evans & McCoy
ATTORNEYS

INVENTORS
Emil F. Schnedarek
BY Thomas J. Smith
Evans & McCoy
ATTORNEYS

April 2, 1935.  E. F. SCHNEDAREK ET AL  1,996,491
APPARATUS FOR MAKING RUBBER TUBES
Filed Feb. 2, 1931  8 Sheets-Sheet 8

Fig. 21.

INVENTORS
Emil F. Schnedarek
BY Thomas J. Smith
Evans & McCoy
ATTORNEYS

Patented Apr. 2, 1935

1,996,491

UNITED STATES PATENT OFFICE 1,996,491

APPARATUS FOR MAKING RUBBER TUBES

Emil F. Schnedarek, Cuyahoga Falls, and Thomas J. Smith, Akron, Ohio, assignors to The General Tire & Rubber Company, Akron, Ohio, a corporation of Ohio Application February 2, 1931, Serial No. 512,993

14 Claims. (Cl. 154—5)

The present invention relates to the manufacture of tubular rubber articles and has for its object to simplify the procedure and reduce the cost of forming the tubular articles from sheet stock prior to the vulcanizing operation.

In the manufacture of tubular rubber articles such, for example, as inner tubes for pneumatic tires, the rubber tube is initially formed by wrapping a thin sheet of raw rubber stock in a plurality of layers about a mandrel. After the rubber stock has been wrapped about the mandrel, it is necessary in order to obtain complete integration of the layers of rubber to compact the rubber on the mandrel in such manner as to press the layers of rubber together throughout the body of the tube and to force out any air which may be trapped between the layers of rubber, thereby causing the layers to be united throughout the body of the tube.

This compacting of the rubber stock is usually accomplished by wrapping a fabric tape spirally on the tube of rubber on the mandrel from one end to the other thereof with sufficient tension on the fabric tape to exert the sufficient radial pressure on the tube as the tape is being wound thereon to progressively compress the layers into intimate contact from one end of the tube to the other. After the tube has been compacted by the winding operation the fabric tape is unwound from the mandrel and the rubber tube is stripped from the mandrel and vulcanized. The handling of the mandrels with the rubber stock thereon and the winding of fabric tape onto the mandrels and unwinding the fabric tape from the mandrels has involved considerable manual labor which has made the process slow and laborious and has been a considerable item in the cost of manufacture.

The present invention has for its object to increase the speed of production and decrease the cost thereof by providing a method of handling the mandrels after the rubber stock has been wrapped thereon and of winding the rubber covered mandrels with tape and unwinding the tape from the mandrels in a continuous and orderly manner, the fabric tape being progressively passed from mandrel to mandrel and successively wound upon and unwound from each mandrel as the mandrels are delivered successively from the wrapping station.

A further object of the invention is to provide a machine for successively winding and unwinding a tape from the mandrels, together with means for advancing mandrels one at a time from one operating position to the next in the winding machine.

A further object of the invention is to provide a winding machine having means for rotatably supporting a pair of mandrels and for rotating one so that a tape may be unwound from one mandrel onto the other, and also providing means for progressively advancing the mandrel through the machine from one supporting means to the other in such manner that each mandrel is first wound with tape and then unwound.

A further object is to provide transfer devices for conveying mandrels from the wrapping station to the tape winding machine in such manner that a considerable number of mandrels may be held by the transfer means out of contact with each other and automatically advanced as mandrels are discharged from the winding machine.

A further object is to provide a common control for the winding machine and transfer devices such that all of the mandrels on the transfer devices are advanced one step each time that a mandrel is discharged from the winding machine, so that the mandrels are advanced progressively from the wrapping station to the winding machine which at all times holds the mandrel which has the tape wound thereon and a second mandrel upon which the tape is wound as it is unwound from the first.

With the above and other objects in view, the invention may be said to comprise a method and apparatus, as illustrated in the accompanying drawings hereinafter described, and particularly set forth in the appended claims, together with such variations and modifications thereof as will be apparent to one skilled in the art to which the invention appertains.

Reference should be had to the accompanying drawings, forming a part of this specification, in which:

Fig. 12 is a top plan view of the winding machine;

In the manufacture of rubber tubes by the method of the present invention, the rubber tubes are initially formed on a wrapping table 1 where a thin sheet of raw rubber is wound about a mandrel 2 to form a tube of rubber on the mandrel. The mandrels 2 are preferably cylindrical tubes which are of a length greater than the length of the sheet of rubber stock which is wrapped on the mandrel to form the tube so that the mandrel projects beyond the opposite ends of a rubber tube formed thereon. After the rubber sheet is wrapped around a mandrel the mandrel is transferred to a rearwardly inclined gravity runway 3 which extends beneath the wrapping table 1 and which delivers to an elevator 4 which transfers the mandrels one at a time from the runway 3 to a tape winding machine 5. The mandrels with the tubes of raw rubber thereon are advanced along the runway 3 and delivered one at a time to the winding machine 5 so that as each mandrel is discharged from the winding machine, another mandrel will be delivered thereto.

In the winding machine, each mandrel delivered thereto first has a fabric tape wound spirally thereon from one end to the other to compact the rubber thereon and this mandrel is then transferred to a second position in the winding machine, in which position, the tape, which has just been wound on the mandrel, is unwound therefrom and wound upon another mandrel which has been delivered to the winding machine. A single fabric tape may thus be caused to pass successively from one mandrel to another, unwinding from one and winding up on the other, so that each mandrel which passes through the winding machine is first wound with tape to compact the rubber tube thereon and then has the tape unwound therefrom onto another mandrel.

Figure 7:
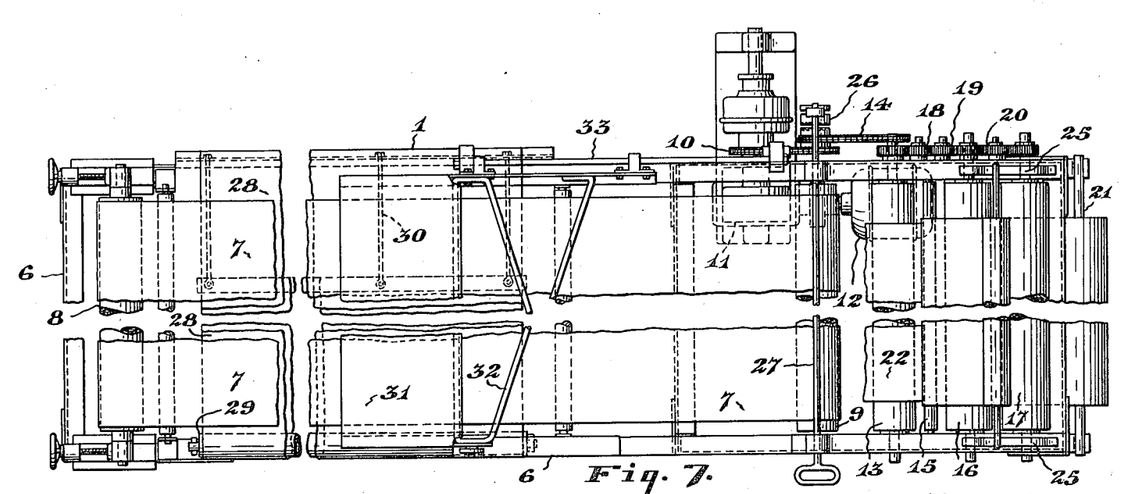
Fig. 7 is a plan view of the stock conveyor and mandrel wrapping table.
Figure 8:
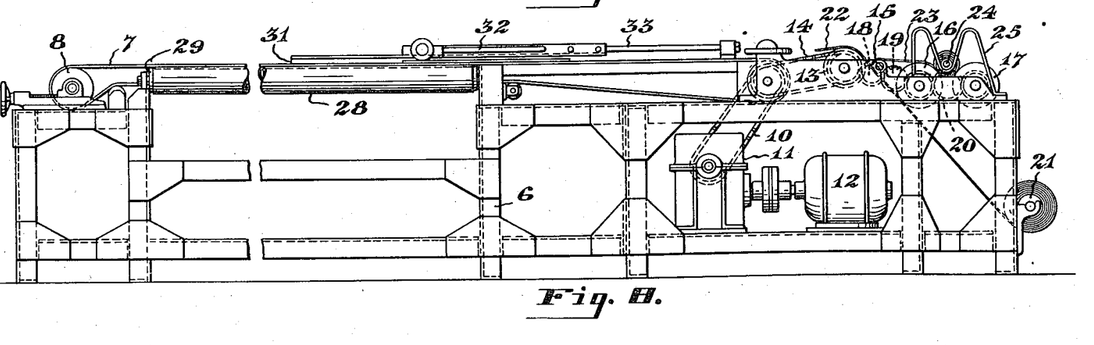
Fig. 8 is a front elevation of the conveyor and table shown in Fig. 7.

The wrapping table 1 has an elongated frame 6 upon the top of which is mounted an endless conveyor belt 7 which is supported at one end on an adjustable pulley 8 and at the opposite end on a driving pulley 9. The driving pulley 9 is driven by a sprocket chain 10 which is driven through suitable reduction gearing in a gear box 11 from an electric motor 12. The driving pulley 9 is spaced from one end of the frame 6 and a feed roller 13 is mounted in the frame beyond the end of the conveyor belt 7, the roller 13 being connected by a sprocket chain 14 to the pulley 9 so that the roller 13 is driven in the same direction as the pulley 9 to advance rubber stock toward the belt 7. Outwardly of the feed roller 13 there is a small idler roller 15, and outwardly of the roller 15 is mounted a pair of reel actuating rollers 16 and 17. The roller 16 is driven from the feed roller 13 in the direction opposite that in which the roller 13 is driven through a pair of intermediate gears 18 and 19, and the roller 17 is driven in the same direction as the roller 16 through an intermediate gear 20.

The rubber stock from which the tubes are formed is wound with a backing of fabric on a reel 21 supported at the end of the frame 6. The sheet rubber stock 22 passes over the feed roller 13 onto a conveyor belt 7 while the fabric backing 23 passes in the opposite direction over the idle roller 15 to a reel 24 supported on and actuated by the rollers 16 and 17, the reel 24 being held upon the rollers 16 and 17 by means of holders 25 mounted on the frame 6 at opposite ends of the rollers 16 and 17.

The belt 7 is operated to deliver stock to the wrapping table 1 as required, the operation of the belt and feed rollers being controlled by a clutch 26 which may be operated by a shifter rod 27 which extends across the conveyor to the front of the frame where it is conveniently accessible to the operator engaged in wrapping the rubber stock on the mandrels.

Figures 9, 10, 11:
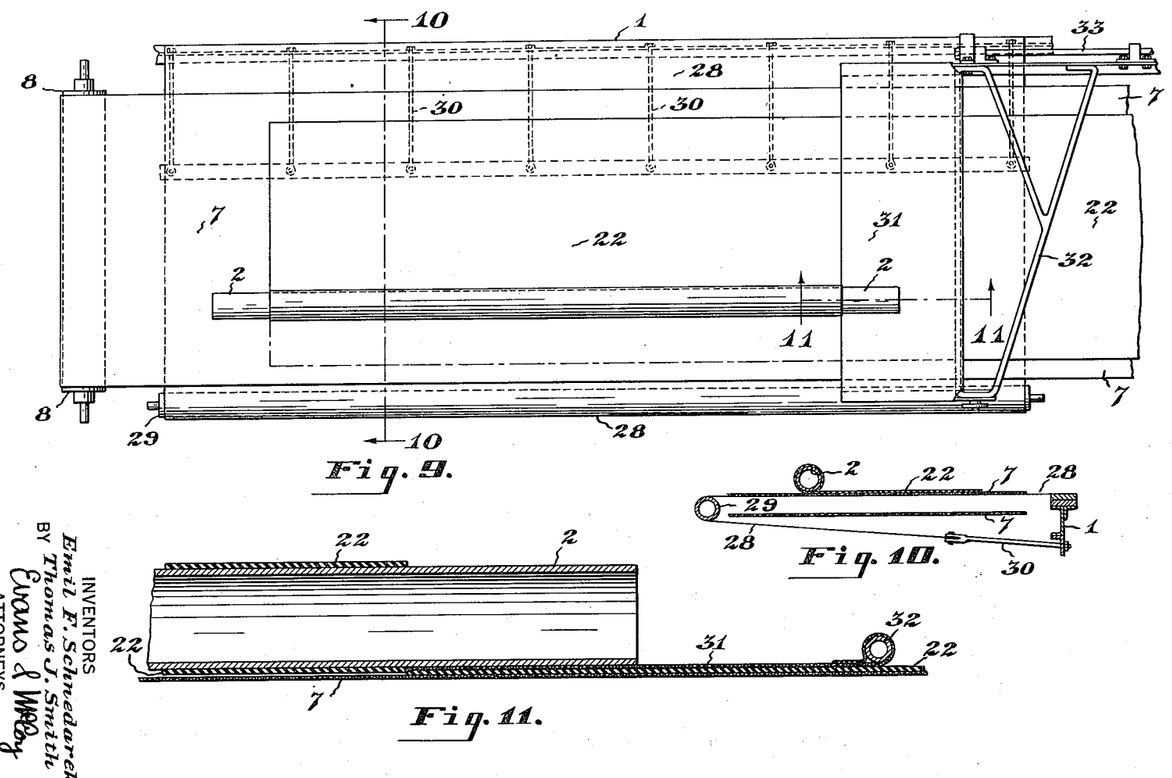
Fig. 9 is a plan view on an enlarged scale of the mandrel wrapping table.
Fig. 10 is a section taken on the line indicated at 10—10 in Fig. 9.
Fig. 11 is a section taken on the line indicated at 11—11 in Fig. 9.

The wrapping table proper comprises a sheet of fabric 28 which is of a width sufficient to provide a support for a sheet of rubber stock being wound on a mandrel and which is attached to the rear side of the frame 6 at the top thereof and extends across the top of the frame beneath the upper run of the belt 7 over a roller 29 at the front side of the frame. The opposite end of the fabric sheet 28 is attached by means of tie rods 30 to the rear side of the frame 6, the tie rods 30 being adjustable to vary the tension of the fabric sheet. The belt 7 is thus flexibly supported to provide a yielding table on which a mandrel may be wrapped upon a sheet of rubber stock lying on the table.

In forming a rubber tube, the conveyor 7 is operated to advance the rubber stock across the table 1 until sufficient stock is positioned on the table to form a tube, whereupon the conveyor is stopped and the operator severs a piece of sheet rubber stock of the desired length from the strip on the conveyor belt. A mandrel 2 is then placed on the forward side edge of the severed piece of sheet rubber and is then rolled toward the rear side of the table, the rubber stock adheres to the mandrel and is wound in a number of layers on the mandrel. In order to prevent the unsevered sheet rubber on the belt from adhering to the end of the mandrel which projects over the same, a fabric guard 31 is provided which extends transversely across the belt and overlies the end of the rubber stock. In wrapping the rubber stock on the mandrel, one end of the mandrel overlies the belt 7 beyond the end of the sheet of rubber being wound on the mandrel, and the opposite end of the mandrel rolls on the fabric guard 31 so that only the severed piece of rubber stock comes in contact with the mandrel as shown in Fig. 11. The fabric guard 31 is carried by a frame 32 which is slidably mounted on a guide rod 33 which is fixed to the table frame 6 at one side thereof so that the guard 31 may be adjusted to proper position with respect to the end of the unsevered rubber stock on the belt 7.

Figures 2, 3:
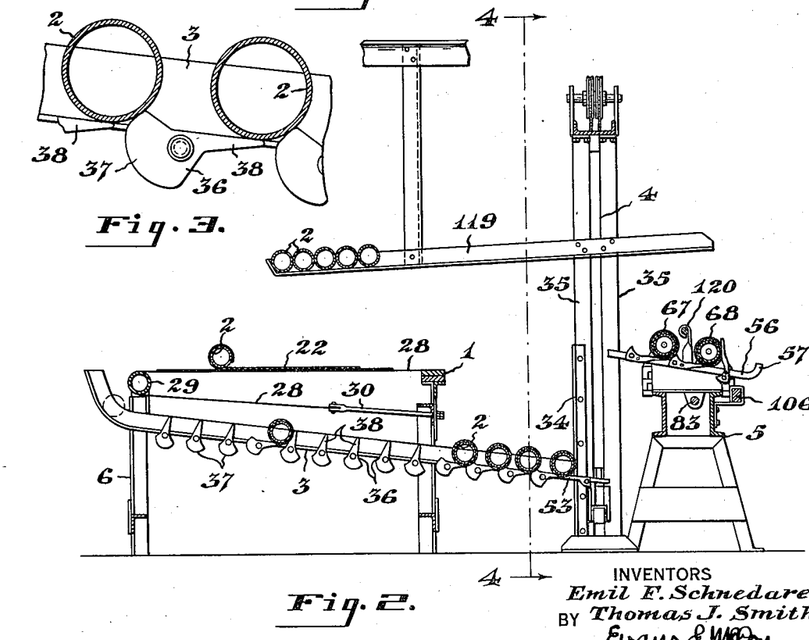
Fig. 2 is a section taken on the line indicated at 2—2 in Fig. 1.
Fig. 3 is a fragmentary section on an enlarged scale showing the pivoted gravity actuated stop members which control the advance of the mandrels along the gravity runway.

The gravity runway 3 which extends beneath the table 1 is inclined rearwardly so that the mandrels will roll by gravity to the rear of the wrapping table, and this runway consists of a pair of spaced angle bars which are engaged by the bare ends of the mandrels 2 beyond the ends of the rubber tube on the mandrel. At the rear end of the runway the mandrels are stopped by guard plates 34 in the form of angle bars attached to vertical guide posts 35 of the elevator 4. The runway 3 is provided along the length thereof with pivoted stop members 36, each of which has a short weighted stop arm 37 and an elongated actuating arm 38 on opposite sides of its supporting pivot. The gravity stop members 36 are mounted on the inner sides of the rails of the runway 3 in position to be engaged by the bare ends of the mandrels and are normally held by their weighted arms 37 in a position in which the arms 38 are in the path of the mandrels 2 as the mandrels roll along the runway. Each of the weighted stop arms 37 is so formed that when the actuating arm 38 is swung down by a mandrel passing over the same, the arm 37 is swung up to a position in which it projects above the bottom of the runway in position to engage and stop a second mandrel. The stop member next adjacent the guard plate 34 is so positioned that when a mandrel is resting against the guard plate 34 it will also rest upon the actuating arms 38 of the rearmost pair of stop members so that the stop arms 37 thereof are held in mandrel stopping position. The stop members forwardly of the rear stop members are each so positioned that they will be held in mandrel stopping position by the mandrel engaging with the stop arm 37 of the stop member immediately in advance thereof.

After a series of mandrels have been delivered to the runway 3 they will be positioned on the runway at uniform distances apart, as shown in Fig. 2 of the drawings, each mandrel being held spaced from the mandrels to the front and rear thereof so that the rubber tubes on the mandrel are not damaged by engagement with other mandrels during the transfer of the mandrels from the table to the tape winding machine.

Figure 4:
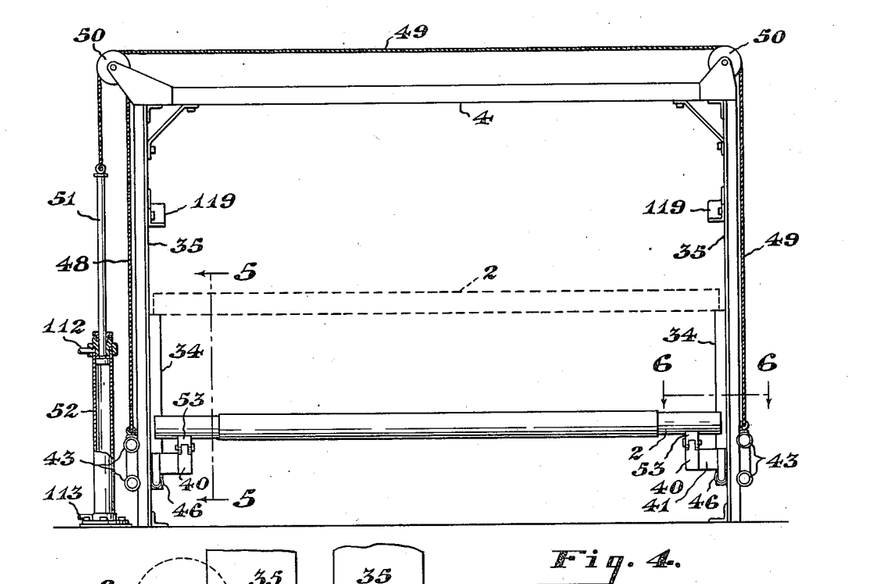
Fig. 4 is a vertical section taken on the line indicated at 4—4 in Fig. 2.

The elevator 4 serves to take the mandrels, one at a time, from the runway 3 and deliver them to the winding machine 5. The guide standards 35 of the elevator 4 are positioned adjacent opposite sides of the runway 3 and are in the form of T-bars positioned with their bases facing inwardly and having webs 39 facing outwardly. The guide standards 35 are arranged in pairs at opposite sides of the runway 3 and on each pair of standards there is mounted an elevator carriage 40. Each of the two carriages 40 has an arm 41 extending between the two adjacent guide standards 35 and carries at its outer end a transverse shaft 42 upon which is mounted flanged rollers 43 which roll on the webs of the T-bars 35. At the inner side of the guide standards 35 the arm 41 has bearing plates 44 attached to opposite sides thereof which support a transverse shaft 45 beneath the arm, which carries a roller 46, the central portion of which projects between the flanges of the adjacent standards, and the opposite ends of which are provided with shoulder portions 47 of reduced diameter which roll on the inner faces of the flanges of the standards 35. Hoist cables 48 and 49 which are attached to the outer ends of the arms 41 of the carriages extend upwardly from the carriages, over sheaves 50 at the top of the elevator frame and downwardly to a piston rod 51 to which they are attached. The piston rod 51 is actuated by a vertically disposed fluid pressure cylinder 52 positioned at one end of the elevator frame.

Figure 5:
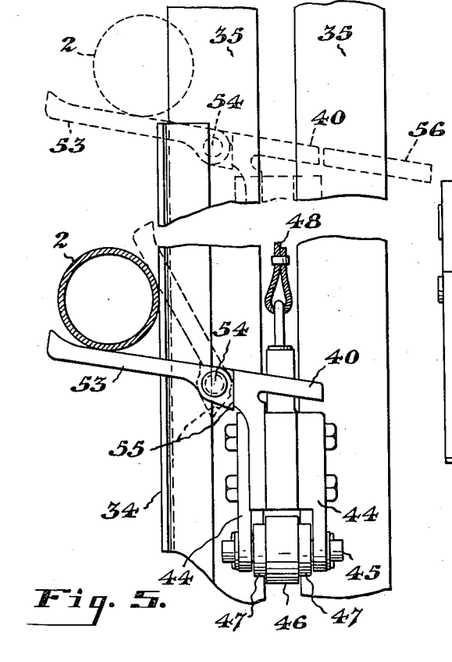
Fig. 5 is a fragmentary section taken on the line indicated at 5—5 in Fig. 4.
Figure 6:
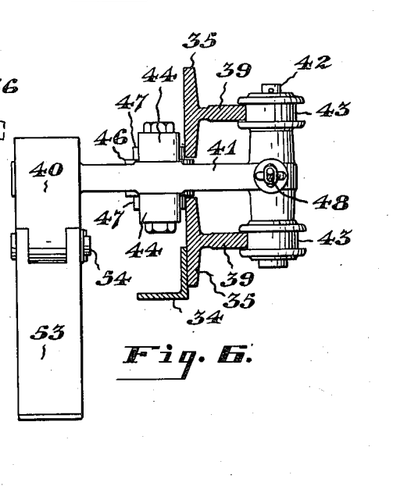
Fig. 6 is a section taken on the line indicated at 6—6 in Fig. 4.

Each of the carriages 40 has a rearwardly inclined top portion to which is attached a forwardly extending arm 53 which is connected to the carriage by a pivot 54 and which has a shoulder 55 engageable with the body of the carriage below the pivot to limit the downward movement of the arm about its pivot and to normally hold the arm at an inclination corresponding to the inclination of the top of the carriage, so that a mandrel supported on the arm tends to roll by gravity toward the inner end thereof. The arms 53 are of sufficient length to engage beneath a mandrel resting against the guard plates 34 and lift the mandrel off the runway 3. The arms 53 are free to swing in an upward direction so that when the carriages 40 are lowered the arms 53 strike a mandrel on the runway 3 and swing upwardly, as shown in dotted lines in Fig. 5, to allow the carriage to pass a mandrel on its downward movement, the arms 53 being so positioned as to engage with the bare ends of the mandrels.

The wrapping machine 5 has a mandrel supporting runway consisting of spaced rearwardly inclined bars 56 to which mandrels are delivered from the elevator 4. The forward ends of the bars 56 are positioned at a height such that they are alined with the tops of the elevator carriages 40 when the carriages are in their uppermost positions, and the guard plates 34 terminate at a level, but slightly above the forward ends of the bars 56, so that when the elevator reaches its uppermost position a mandrel supported on the arms 53 is above the upper ends of the guard plates 34 and is free to roll rearwardly over the inclined tops of the carriages 40 onto the runway bars 56. The rear ends of the inclined runway bars 56 are provided with upwardly curved portions 57 which form stops to retain a mandrel which has reached the end of the runway.

The bars 56 are provided with gravity stop members 58 similar to the gravity stop members 36 on the runway 3, each of the stop members 58 being provided with a weighted stop arm 59 and an oppositely extending actuating arm 60. The rearmost stop members 58 are so positioned with respect to the stops 57 of the runway bars that when a mandrel is in engagement with the stops 57 the rearmost stop members will be held with the weighted ends thereof projecting above the tops of the runway bars 56 to stop a mandrel rolling down the runway. The stop members 58 immediately in advance of the rearmost stop member are so positioned that they are held in mandrel stopping position by a mandrel in engagement with the rearmost stop members. The runway bars 57 are thus provided with devices for automatically stopping the mandrels at predetermined spaced points in the runway and for automatically releasing the mandrels and permitting each to advance from one stop to the next when the mandrels are released by the winding machine.

The winding machine 5 is provided at the opposite ends thereof with slides 61 and 62 which are mounted to move horizontally in a direction at right angles to the runway bars 56. The slide 61 is provided with front and rear bearing brackets 63 and 64 which carry shafts 65 and 66 on the inner ends of which are rotatably mounted conical centers 67 and 68. The centers 67 and 68 have limited sliding movement on the shafts 65 and 66, and buffer springs 69 and 70 are interposed between the centers 67 and 68 and the brackets 63 and 64. The slide 62 at the opposite end of the winding machine frame is provided with front and rear bearing brackets 71 and 72 which have shafts 73 and 74 journalled therein which are in axial alignment with the shafts 65 and 66, respectively. The shafts 73 and 74 have conical centers 75 and 76 fixed thereto. The slides 61 and 62 are adapted to be simultaneously moved toward and away from opposite sides of the runway 56 to clamp one mandrel between the conical centers 67 and 75 and another between the centers 68 and 76. The spacing of the two pairs of centers 67 and 75, 68 and 76 corresponds to the spacing of the gravity stop members 58 so that mandrels on the runway 66 may be simultaneously clamped between the centers and simultaneously released.

The shaft 73 has a gear 77 rotatably mounted thereon which may be driven by an electric motor 78 and which may drive the shaft 73 through a clutch 79. The shaft 74 has a brake drum 80 fixed thereto which is engaged by a pivoted brake shoe 81 which may be adjusted by means of a screw 82 to vary the frictional resistance to turning movement so that a drag may be imposed on the center 76, retarding the rotation of a mandrel supported on the centers 68 and 76 from which a tape is being unwound and so that the desired tension may be applied to the tape as it is unwound from the mandrel on centers 68 and 76 onto a mandrel supported by the centers 67 and 75. The tension applied to the tape may be varied as desired by adjusting the screw 82 to vary the pressure of the shoe 81 on the drum 80.

Figures 13, 14:
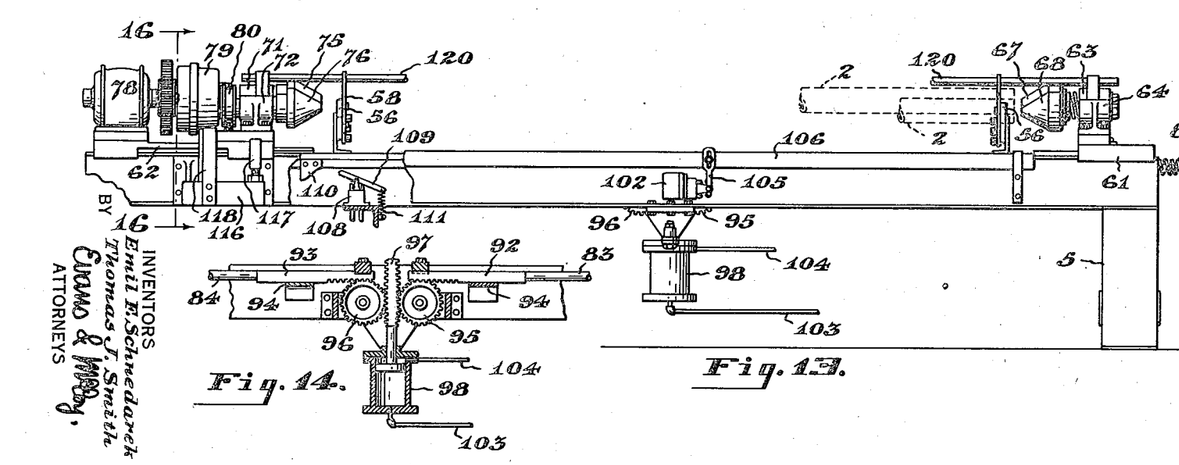
Fig. 13 is a rear elevation of the winding machine.
Fig. 14 is a section taken on the line indicated at 14—14 in Fig. 12 showing the mechanism for actuating the mandrel clamping slides of the winding machine.
Figure 15:
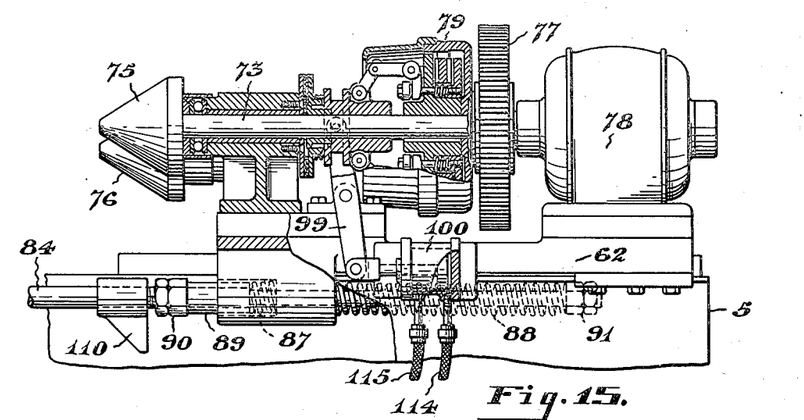
Fig. 15 is a rear view of the wrapping machine head stock viewed as indicated by 15—15 in Fig. 12.
Figure 16:
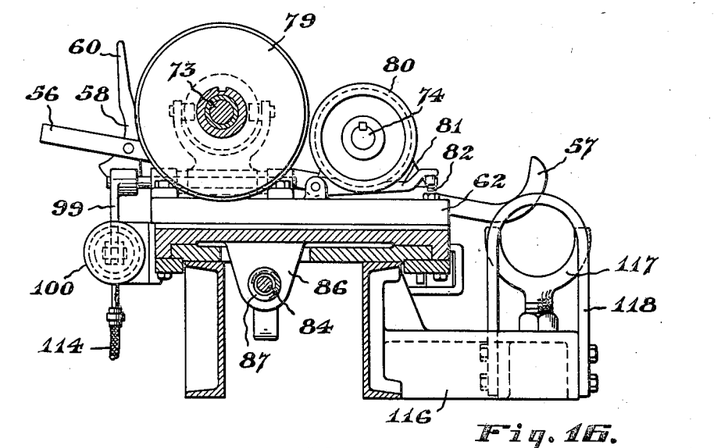
Fig. 16 is a section taken on the line indicated at 16—16 in Fig. 13.
Figure 17:
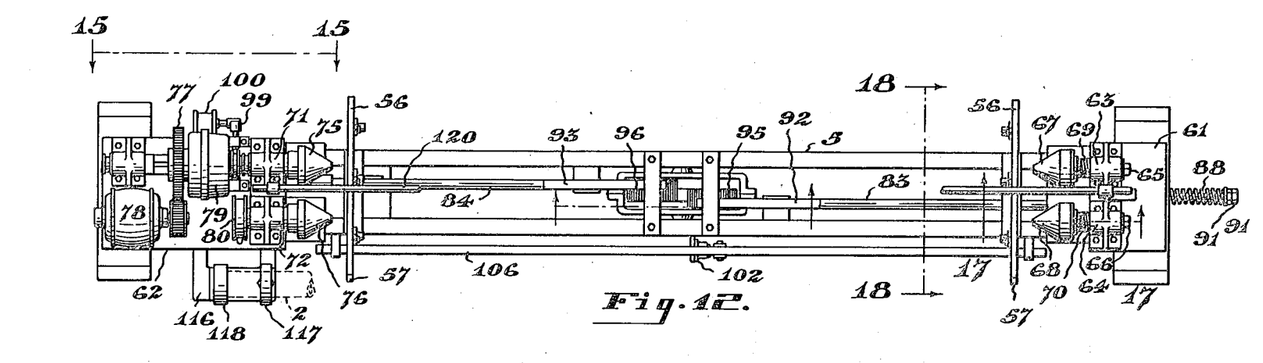
Fig. 17 is a section taken on the line indicated at 17—17 in Fig. 12.

As best shown in Figs. 12 and 14, the slides 61 and 62 may be simultaneously actuated by means of shifter rods 83 and 84 which extend through integral projections 85 and 86 extending downwardly from the bottoms of the slides. The shifter rods 83 and 84 are yieldably connected to the slides by means of buffer springs 87 and 88 which are positioned on the inner and outer sides of the projections 85 and 86, the inner springs 87 being interposed between inner collars 89 on the rods and the inner faces of the projections and the collars 89 being adjustable by means of nuts 90 to vary the tension of the springs. The outer buffer springs 88 are interposed between the outer faces of the projections 85 and 86 and nuts 91 on the outer ends of the rods, nuts 91 being adjustable to vary the tension of the springs 88. At their inner ends the shifter rods 83 and 84 are provided with short racks 92 and 93 which are held by guides 94 in engagement with pinions 95 and 96. The pinions 95 and 96 may be simultaneously turned in opposite directions by means of an actuating rack 97 extending vertically between the two pinions, the rack 97 being attached to the piston of a fluid pressure cylinder 98. By controlling the delivery of fluid under pressure to opposite ends of the cylinder 98 the actuating rack 97 may be moved upwardly or downwardly to move the slides 61 and 62 apart to disengage the centers from mandrels or downwardly to simultaneously move the slides toward each other to clamp a pair of mandrels between the centers carried by the slides.

The clutch 79 controlling the actuation of the shaft 73 is operated by means of a clutch lever 99 which is actuated by a hydraulic cylinder 100, so that the center 75 may be connected with its driving means after the mandrels have been clamped to wind the tape from one mandrel to the other.

The operation of the elevator carriages 40, the slide actuating means and the clutch 79 are preferably simultaneously controlled so that when the slides 61 and 62 are moved apart to release a pair of mandrels the elevator carriages 40 will be actuated to deliver another mandrel to the runway 56 and when the slides 61 and 62 are actuated to clamp a pair of mandrels the clutch 79 will be automatically actuated to connect the center 75 with its driving means so that the winding operation may be immediately started.

Figure 21:
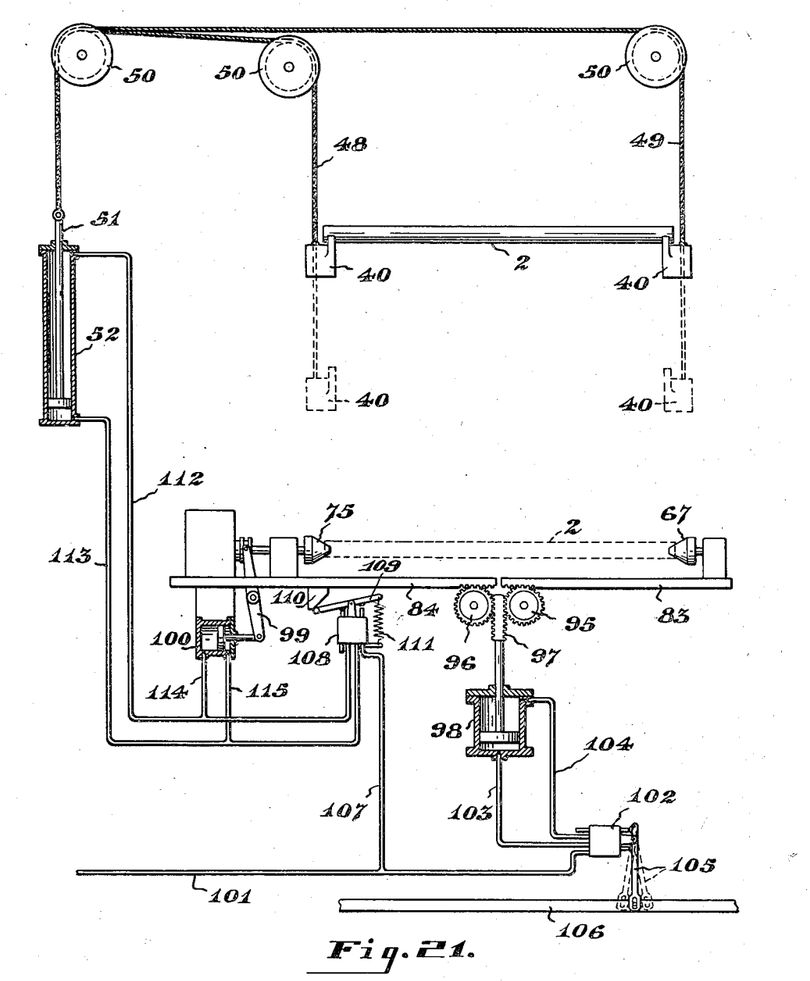
Fig. 21 is a diagrammatic view showing the fluid pressure cylinders for operating the elevator, for actuating the slides of the winding machine and for controlling the winding machine clutch, together with the fluid pressure supply lines for the cylinders and the manually and automatically operated controlling valves, by means of which the operation of the various cylinders is controlled.

The mechanisms above referred to are actuated by the cylinders 52, 98 and 100 and sequential operation is obtained by controlling the supply of fluid to the cylinders. The fluid supply lines leading to the actuating cylinders and the means for controlling the supply of pressure to the cylinders is shown diagrammatically in Fig. 21 in which, for convenience of illustration, the various mechanical elements are shown in positions somewhat different from that which they actually occupy in the machine. As shown in Fig. 21, fluid under pressure for actuating the cylinders may be supplied by an air line 101 which communicates with a manually operable control valve 102 which is connected by pipes 103 and 104 to the lower and upper ends of the cylinder 98 to supply pressure to said cylinder to raise or lower the rack 97 to actuate the center carrying slides. The valve 102 is a control valve of ordinary construction capable of connecting the supply line 101 with either of the lines 103 and 104 to supply pressure to one end or the other of the cylinder 98 and simultaneously opening the other line to permit the air to exhaust from the opposite end of the cylinder. The valve 102 has an actuating lever 105 which is connected to a manually operable shifter rod 106 which extends horizontally along the rear side of the winding machine frame as shown in Fig. 13, and which may be grasped by an operator standing at the rear of the winding machine and shifted in one direction or the other to operate the valve 102 to deliver fluid to either end of the cylinder 98 to move the center carrying slides toward each other or away from each other as desired. The pressure supply line 101 has a branch 107 extending to an automatically controlled valve 108, which is provided with an actuating lever 109, which is positioned in the path of a trip cam 110 carried by the shifter rod 84. The lever 109 is normally held in one position by means of a coil spring 111 and is shifted in opposition to the spring 111 by the cam 110 as the slides move inwardly to clamping position. Pipes 112 and 113 extend from the control valve 108 to the upper and lower ends of the cylinder 52 which operates the elevator carriages 40. The pipe 112 has a branch 114 extending to one end of the clutch operating cylinder 100 and the pipe 113 has a branch 115 extending to the opposite end of the cylinder 100. When the slides 61 and 62 are brought to their innermost position, as shown in Fig. 21, the valve 108 is moved to the position in which it establishes communication from the pressure line 101 through the pipe lines 107 and 112 to the upper end of the cylinder 52 to move the carriages 40 to their uppermost position. At the same time communication is established between the pipe line 112 and the end of the cylinder 100 at which pressure exerted on the piston of the cylinder in a direction to shift the clutch 79 to engaging position, so that the clutch is engaged and held in engagement while a mandrel is clamped between the centers 67 and 75. When the slides 61 and 62 are shifted outwardly to release the mandrel the cam 110 moves away from the lever 109 which is shifted by the spring 111 to its opposite position in which communication is established from the pipe line 101 through the lines 107 and 113 to the lower end of the cylinder 52 to raise the piston 51 and lower the elevator carriages 40, communication being simultaneously established through the pipe 115 with the opposite end of the cylinder 100 to shift the clutch 79 to disengaging position. It will be apparent that whenever the slides 61 and 62 are moved apart by the shifter rods 83 and 84, the valve 108 is automatically actuated to return the elevator carriages 40 to their lowermost position and to shift the clutch 79 to disengaging position. After each of the mandrels on the runway 56 has been advanced one step following the release of the mandrels held by the centers on the slides 61 and 62, the shifter rod 106 may be actuated to reverse the pressure in the cylinder 98 and to return the centers to clamping position. The movement of the shifter rod 84 causes actuation of the lever 109 to reverse the pressure in the cylinder 52 and elevate the carriages 40 to bring another mandrel to the runway 56. At the same time pressure is reversed in the cylinder 108 to shift the clutch 79 to engaging position, so that the mandrel held between the centers 75 and 67 will be driven.

In manufacturing tubes by the method of the present invention, one or more operators standing in front of the table 1 will wrap the mandrels 2 with pieces of sheet rubber severed from the strip on the conveyor belt 7 and after the rubber sheet has been rolled onto an individual mandrel that mandrel will be dropped onto the gravity runway 3 and will roll down the runway until it is stopped either by the guard plate 34 or by one of the automatic stop members 37. A considerable number of mandrels with rubber tubes thereon can be accommodated on the runway 3 so that a momentary interruption of the mandrel wrapping operation will not prevent continuous operation of the winding machine.

In starting the machine in operation an empty mandrel may be first dropped on the runway 3 and transferred to the runway 56 by the elevator 4 while the slides 61 and 62 are in their outermost position so that the empty mandrel will roll down into engagement with the stop 57 and position the rearmost stop member 58 in mandrel stopping position so that the next mandrel delivered to the runway 56 will be stopped in alignment with the centers 68 and 76. A second mandrel wound with fabric tape may then be placed in alignment with the centers 68 and 76 either by an operator standing at the rear of the wrapping machine or by passing the mandrel over the runway 3 and transferring the same to the runway 56 by means of the elevator 4. The winding machine now has a tape wound mandrel in position for delivering the tape thereon to a mandrel clamped by the other pair of centers 67 and 75 and is ready to receive the first mandrel to be wound with tape. The mandrels 2 may now be wrapped successively on the table 1 with sheet rubber stock and delivered to the runway 3. After each winding operation is completed the shifter rod 106 is moved in a direction to cause the slides 61 and 62 to be separated, allowing the mandrel held by centers 68 and 76 to roll down into engagement with the stops 57 and the mandrel held between the centers 67 and 75 to roll down into engagement with the rearmost stop member 58, which positions the latter mandrel in alignment with the centers 68 and 76. At the same time a mandrel on the runway 56 engaged by the stop member 58 which had previously been held in mandrel stopping position by the mandrel clamped between the centers 67 and 75 will be released and will roll down to a position in alignment with the centers 67 and 75. The shifter rod 106 is then actuated in a direction to cause the slides to move toward each other and to clamp the two mandrels between the centers 68 and 76 and 67 and 75 and to simultaneously connect the forward mandrel to the driving means so that the tape wound on the rear mandrel may be unwound from the rear mandrel onto the forward mandrel. As each mandrel is delivered to the lower end of the runway 56 it is taken off the runway by the operator and the rubber tube is stripped off the mandrel by pulling the tube over the mandrel and simultaneously turning the tube inside out, compressed air from a suitable nozzle being employed to assist in the operation as is common practice in the art. In order to hold the mandrels while stripping the tubes from the mandrel, a clutch loop mandrel holder is provided on the rear side of the wrapping machine frame. This holder consists of a bracket 116 which carries a saddle 117 and a loop 118. The end of a mandrel is placed on the saddle and with its end extending through the loop 118 so that the saddle acts as a fulcrum and weight of the mandrel clamps the mandrel between the saddle and loop so that the mandrel may be held while the tube is being stripped from the mandrel. After the mandrels have been stripped they are placed by the operator in an overhead magazine 119 which is in the form of an inclined runway extending forwardly from above the wrapping machine 5 to a point over the table 1 where the mandrels can be conveniently reached by an operator standing in front of the wrapping table 1.

Figure 18:
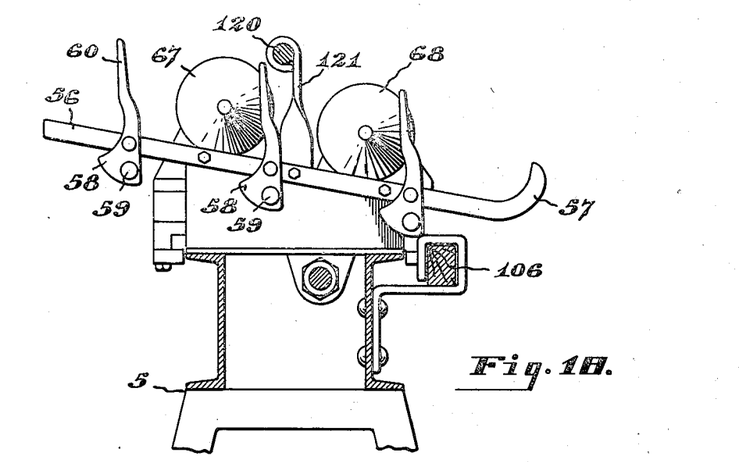
Fig. 18 is a section taken on the line indicated at 18—18 in Fig. 12.
Figure 19:
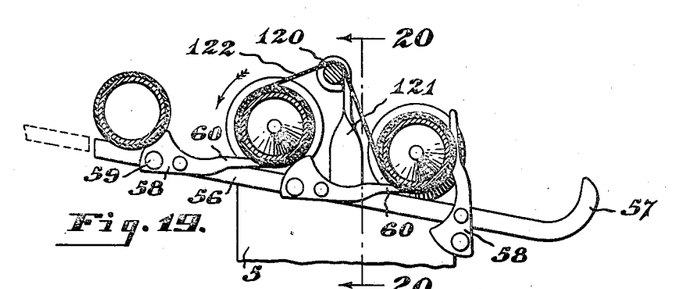
Fig. 19 in a section similar to Fig. 18 showing mandrels in place in the winding machine.

As best shown in Figs. 18 and 19 a guide rod 120 extends across the space between the slides 61 and 62 and is slidably supported in brackets 121 mounted between the centers on each of the slides. The guide rod 120 is positioned above the mandrels clamped between the centers and provides a guide for the fabric tape 122 as it is passed from the rear mandrel to the forward mandrel clamped in the winding machine. As shown in Fig. 19 the tape 122 is passed upwardly from the under side of the mandrel held between the rearmost pair of centers over the top of the guide rod 120 and over the top of the mandrel clamped between the forward pair of centers.

Figure 1:
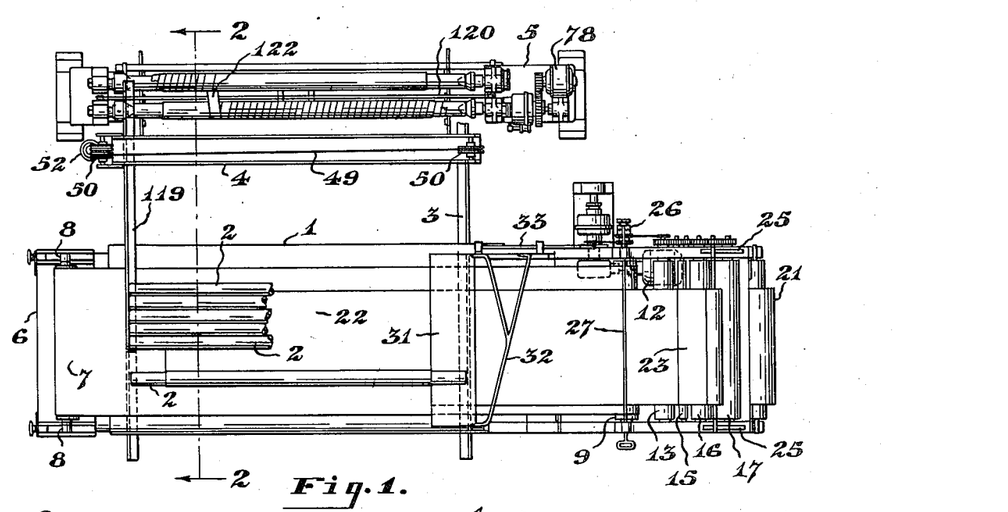
Fig. 1 is a plan view of apparatus embodying the invention.
Figure 20:
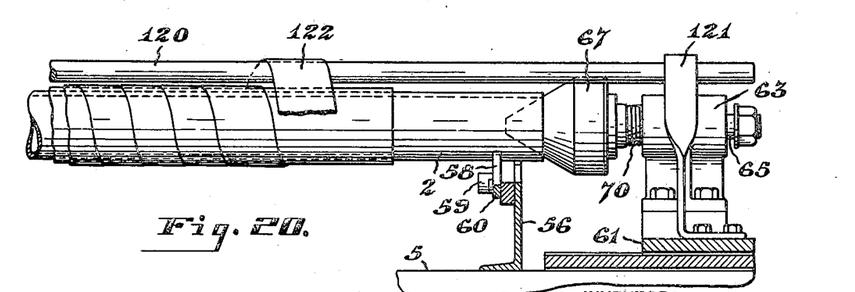
Fig. 20 is a section taken on the line indicated at 20—20 in Fig. 19.

As clearly shown in Figs. 1 and 20, the tape 122 is wrapped spirally about each mandrel so that it covers the tube from end to end, and when the forward mandrel is driven in a direction to wind up the tape thereon, the tape will be guided along the rod 120 and wound spirally on said mandrel to compress the rubber tube progressively from one end to the other thereof.

It will be apparent that the present invention provides a method of operation by which the tube compacting operation is performed rapidly and sequentially on the rubber tubes carried by the mandrels.

It will further be apparent that by reason of the fact that means is provided for storing a considerable number of wrapped mandrels between the wrapping table and the winding machine, that casual interruptions in the operation of the winding machine will not make it necessary to discontinue the tube forming operation, and interruptions in the forming of tubes will not interfere with continuous operation of the winding machine. For instance, if the tube forming at the wrapping station is momentarily interrupted, the winding of mandrels can continue until the reserve supply is exhausted. On the other hand, if the winding operation is interrupted, the forming of tubes can continue until the transfer runway has been filled.

The apparatus of the present invention accomplishes the handling of the mandrels and the compacting of the rubber tubes thereon with a minimum of manual labor, providing a supply of empty mandrels convenient for the operators at the wrapping table and automatically supplying tube carrying mandrels to the winding machine as they are required.

Furthermore, it is to be understood that the particular form of apparatus shown and described, and the particular procedure set forth, are presented for purposes of explanation and illustration and that various modifications of said apparatus and procedure can be made without departing from our invention as defined in the appended claims.

What we claim is:

1. Apparatus for making rubber tubes comprising means for supporting and rotating a mandrel upon which a tube of rubber has been formed, means for rotatably supporting a second mandrel parallel to the first whereby a tape may be wound off the second mandrel and onto the first, means for retarding rotation of the second mandrel to maintain a tension on the tape, and means for delivering mandrels one at a time to the first supporting means and for transferring the mandrels successively from the first supporting means to the second whereby the tape may be wrapped upon the mandrels successively.

2. Apparatus for making rubber tubes comprising means for supporting and rotating a mandrel upon which a tube of rubber has been formed, means for rotatably supporting a second mandrel parallel to the first whereby a tape may be wound off the second mandrel and onto the first, means for retarding rotation of the second mandrel to maintain a tension on the tape, means for discharging a mandrel from the second supporting means and for transferring a mandrel from the first supporting means to the second supporting means, and means for simultaneously delivering a mandrel to the first supporting means.

3. Apparatus for making rubber tubes comprising means for supporting and rotating a mandrel upon which a tube of rubber has been formed, means for rotatably supporting a second mandrel parallel to the first whereby a tape may be wound off the second mandrel and onto the first, means for retarding rotation of the second mandrel to maintain a tension on the tape, conveying means for advancing mandrels one at a time to said first supporting means, means for actuating said conveying means and for simultaneously discharging a mandrel from said second supporting means and transferring a mandrel from the first supporting means to the second.

4. Apparatus for making rubber tubes comprising a pair of axially aligned rotatable centers engageable with opposite ends of a mandrel, means for driving one of said centers, a second pair of axially aligned rotatable centers parallel with and in proximity to the first mentioned pair and adapted to engage the ends of a second mandrel, a brake operatively connected with one of said second pair of centers, means for actuating the centers of each pair to clamp and release a mandrel, and means for delivering mandrels one at a time to the first pair of centers and for transferring the tubes successively from the first pair of centers to the second.

5. Apparatus for making rubber tubes comprising a pair of axially aligned rotatable centers engageable with opposite ends of a mandrel, means for driving one of said centers, a second pair of axially aligned rotatable centers parallel with and in proximity to the first mentioned pair and adapted to engage the ends of a second mandrel, a brake operatively connected with one of said second pair of centers, means for moving certain of said centers axially to clamp or release the mandrels, means for advancing a mandrel released by the first pair of centers to a position in alignment with the second pair of centers, and means for delivering mandrels one at a time to a position in alignment with the first pair of centers.

6. Apparatus for making rubber tubes comprising a pair of axially aligned rotatable centers engageable with opposite ends of a mandrel, means for driving one of said centers, a second pair of axially aligned rotatable centers parallel with and in proximity to the first mentioned pair and adapted to engage the ends of a second mandrel, a brake operatively connected with one of said second pair of centers, means for simultaneously releasing the mandrels from said centers, an inclined mandrel runway extending transversely past said pairs of centers to convey the mandrels to and away from said centers, means controlled by a mandrel released by the second pair of centers for stopping the mandrel released from the first pair of centers in axial alignment with the second pair of centers, and means controlled by the latter mandrel for aligning a third mandrel with said first pair of centers.

7. Apparatus for making rubber tubes comprising a pair of axially aligned rotatable centers engageable with opposite ends of a mandrel, means for driving one of said centers, a second pair of axially aligned rotatable centers parallel with and in proximity to the first mentioned pair and adapted to engage the ends of a second mandrel, a brake operatively connected with one of said second pair of centers, means for simultaneously releasing the mandrels from said centers, an inclined mandrel runway extending transversely past said pairs of centers to convey the mandrels to and away from said centers, means controlled by a mandrel released by the second pair of centers for stopping the mandrel released from the first pair of centers in axial alignment with the second pair of centers, means controlled by said mandrel releasing means for delivering a third mandrel to said runway, and means controlled by the mandrel released from the first pair of centers for stopping said third mandrel in axial alignment with the first pair of centers.

8. Apparatus for making rubber tubes comprising a mandrel wrapping table, a tape winding machine to the rear of said table, a rearwardly inclined mandrel runway beneath the table, an elevator for transferring mandrels from the runway to the winding machine, and an overhead runway over the table and winding machine for returning mandrels to a position over the wrapping table.

9. Apparatus for making rubber tubes comprising a runway for mandrels having tubes of rubber thereon, means for stopping mandrels at predetermined points along the length of the runway, mandrel engaging centers on opposite sides of the runway adjacent one of said stopping points and mounted for movement toward and away from the runway to clamp and release mandrels stopped on the runway, means for actuating said centers, and means for driving one of said centers.

10. Apparatus for making rubber tubes comprising a mandrel support having means for holding a pair of mandrels in parallel spaced relation, two pairs of mandrel engaging centers alined with the mandrels so held, means for simultaneously moving said centers toward each other to clamp the mandrels and away from each other to release the mandrels, means for driving a center of one pair, a brake connected to a center of the other pair, and means for automatically connecting the driven center to its driving means as the centers are moved to mandrel clamping position.

11. Apparatus for making rubber tubes comprising a mandrel support having means for holding a pair of mandrels in parallel spaced relation, two pairs of mandrel engaging centers alined with the mandrels so held, means for simultaneously moving said centers toward each other to clamp the mandrels and away from each other to release the mandrels, means for driving a center of one pair, a brake connected to a center of the other pair, and means controlled by said center shifting means for advancing a mandrel from its position in alinement with the driven center to a position in alinement with the center to which a brake is connected and for simultaneously advancing a third mandrel into alinement with the driven center.

12. Apparatus for making rubber tubes comprising a wrapping table having an endless stock feeding belt thereon, means for controlling the operation of said belt to deliver the required amount of sheet rubber stock to the table, and a fabric guard resting on the sheet rubber stock and extending transversely across the same to hold tube forming mandrels out of contact with the end of the unsevered portion of the rubber stock on the table.

13. Apparatus for making rubber tubes comprising means for supporting and rotating a mandrel having a tube of rubber thereon, means for rotatably supporting a second mandrel parallel to the first whereby a tape may be wound off the second mandrel onto the first, means for releasing the mandrels and for transferring the wound mandrel from the first mentioned supporting means to the second and for transferring a third mandrel to the first supporting means whereby the tape may be wrapped upon the mandrels successively.

14. Apparatus for making rubber tubes comprising a winding machine having means for rotatably supporting two parallel mandrels, and for driving one of the mandrels, manually controlled means for releasing the mandrels from the supporting means and for discharging one of said mandrels from the machine and means automatically controlled by said releasing means for advancing the other mandrel to the position previously occupied by the first and for delivering a third mandrel to the machine.

EMIL F. SCHNEDAREK.
THOMAS J. SMITH.